United States Patent
Yoshioka et al.

(10) Patent No.: US 10,155,188 B2
(45) Date of Patent: Dec. 18, 2018

(54) OIL SEPARATOR, AND COMPRESSOR PROVIDED WITH SAME

(71) Applicant: MITSUBISHI HEAVY INDUSTRIES THERMAL SYSTEMS, LTD., Minato-ku, Tokyo (JP)

(72) Inventors: Akinori Yoshioka, Aichi (JP); Ichiro Yogo, Aichi (JP)

(73) Assignee: MITSUBISHI HEAVY INDUSTRIES THERMAL SYSTEMS, LTD., Tokyo (JP)

(*) Notice: Subject to any disclaimer, the term of this patent is extended or adjusted under 35 U.S.C. 154(b) by 249 days.

(21) Appl. No.: 14/904,915

(22) PCT Filed: Aug. 20, 2014

(86) PCT No.: PCT/JP2014/071713
§ 371 (c)(1),
(2) Date: Jan. 13, 2016

(87) PCT Pub. No.: WO2015/029845
PCT Pub. Date: Mar. 5, 2015

(65) Prior Publication Data
US 2016/0136555 A1   May 19, 2016

(30) Foreign Application Priority Data
Aug. 28, 2013 (JP) .................... 2013-176581

(51) Int. Cl.
*A47L 5/36* (2006.01)
*B01D 45/12* (2006.01)
(Continued)

(52) U.S. Cl.
CPC ............ *B01D 45/12* (2013.01); *B04C 5/10* (2013.01); *F04B 39/023* (2013.01); *F04B 39/04* (2013.01);
(Continued)

(58) Field of Classification Search
CPC ........ B01D 45/12; F25B 31/002; F25B 43/02; F25B 2500/18; F04B 39/04; F04B 39/023; B04C 5/10
See application file for complete search history.

(56) References Cited

U.S. PATENT DOCUMENTS

| 1,522,903 | A | * | 1/1925 | Pabodie | .................... | B04C 5/00 |
| | | | | | | 55/433 |
| 1,721,908 | A | * | 7/1929 | Heist | ........................ | B04C 1/00 |
| | | | | | | 15/DIG. 8 |

(Continued)

FOREIGN PATENT DOCUMENTS

| CN | 101351644 A | 1/2009 |
| CN | 101884863 A | 11/2010 |

(Continued)

OTHER PUBLICATIONS

Office Action dated Nov. 18, 2016 in corresponding Chinese Patent Application No. 201480040725.1 with an English Translation.

(Continued)

*Primary Examiner* — Dung H Bui
(74) *Attorney, Agent, or Firm* — Birch, Stewart, Kolasch & Birch, LLP (57) ABSTRACT

Provided are: an oil separator with which oil-separation efficiency can be improved by reliably capturing oil once separated, and inhibiting the re-entrainment of the oil; and a compressor provided with the oil separator. This oil separator (1) is provided with a cylindrical separation cylinder (2), and is configured such that oil included in a gas flowing in from a gas inflow port (5) provided along an inner circumferential surface (4) of the separation cylinder (2) in a tangential direction is centrifugally separated, and the separated oil is discharged from one end side of the separation cylinder (2), while the gas is discharged from another end side of the separation cylinder (2). The oil separator (1)

(Continued)

has, provided to the inner circumferential surface (4) of the separation cylinder (2) therein, an opening (9) which communicates with the gas inflow port (5), and a plurality of oil-capturing openings (10) which protrude toward and are open at an inner circumferential side. Furthermore, in the oil separator (1), a cylindrical body (8) is fitted which has, provided to an outer circumferential surface side thereof, a plurality of oil passages (11) which communicate with the oil-capturing openings (10).

10 Claims, 9 Drawing Sheets (51) Int. Cl.
    *B04C 5/10*     (2006.01)
    *F04B 39/02*     (2006.01)
    *F04B 39/04*     (2006.01)
    *F25B 43/02*     (2006.01)
    *F25B 31/00*     (2006.01)

(52) U.S. Cl.
    CPC ............ *F25B 31/002* (2013.01); *F25B 43/02* (2013.01); *F25B 2500/18* (2013.01)

(56) References Cited

U.S. PATENT DOCUMENTS

| | | | | |
|---|---|---|---|---|
| 2,147,671 A * | 2/1939 | Pratt | ...................... | B01D 45/16 138/42 |
| 2,229,860 A * | 1/1941 | McCurdy | ........... | B01D 21/0012 210/304 |
| 2,705,053 A * | 3/1955 | Morris | ............... | B01D 19/0057 210/512.1 |
| 2,734,630 A * | 2/1956 | Wal | ............................ | B04C 5/02 209/728 |
| 2,974,668 A * | 3/1961 | Witzel | ...................... | A01F 7/06 209/300 |
| 4,375,386 A * | 3/1983 | Windham | ............... | B01D 1/305 159/31 |
| 4,678,588 A * | 7/1987 | Shortt | .................... | B01D 45/16 209/459 |
| 5,113,671 A * | 5/1992 | Westermeyer | .......... | F25B 43/02 55/337 |
| 5,733,107 A | 3/1998 | Ikeda et al. | | |
| 5,755,965 A * | 5/1998 | Reiber | ............... | B01D 19/0057 210/512.1 |
| 5,840,198 A * | 11/1998 | Clarke | ............... | B01D 17/0211 210/519 |
| 6,019,825 A * | 2/2000 | Greene | ............. | B01D 17/0217 210/512.1 |
| 6,656,327 B2 * | 12/2003 | Salmisuo | ............... | B01D 1/065 122/491 |
| 9,616,431 B2 * | 4/2017 | Lyon | ....................... | E21B 43/34 |
| 2001/0029727 A1 | 10/2001 | Iwanami et al. | | |
| 2007/0251256 A1* | 11/2007 | Pham | .................... | F04C 29/042 62/324.1 |
| 2009/0246060 A1 | 10/2009 | Inoue et al. | | |
| 2011/0146215 A1 | 6/2011 | Lee et al. | | |
| 2013/0199137 A1* | 8/2013 | Hallgren | ................ | B01D 45/16 55/393 |

FOREIGN PATENT DOCUMENTS

| | | |
|---|---|---|
| CN | 102084094 A | 6/2011 |
| JP | 60-94164 A | 5/1985 |
| JP | 63-66122 U | 5/1988 |
| JP | 2-137916 U | 11/1990 |
| JP | 9-60591 A | 3/1997 |
| JP | 2830618 B2 | 9/1998 |
| JP | 2001-295767 A | 10/2001 |
| JP | 2003-27917 A | 1/2003 |
| JP | 2004-324564 A | 11/2004 |
| JP | 2010-286193 A | 12/2010 |
| JP | 2011-185597 A | 9/2011 |
| JP | 2013-15069 A | 1/2013 |

OTHER PUBLICATIONS

Japanese Decision to Grant a Patent dated Jul. 19, 2016, for Japanese Application No. 2013-176581.

* cited by examiner

OIL SEPARATOR, AND COMPRESSOR PROVIDED WITH SAME

TECHNICAL FIELD

The present invention relates to a cyclone-type oil separator that separates oil included in a refrigerant gas, and a compressor provided with the same.

BACKGROUND ART

In an air conditioner, a refrigerator, and the like, an oil separator is installed in a discharge circuit to separate the oil included in the gas discharged from the compressor. Examples of oil separators conventionally known include a cyclone-type oil separator that causes a vortex to develop in the gas that includes the oil, and separates the oil using centrifugal force. Patent Document 1 discloses an oil separator in which a gas outflow pipe is inserted and installed in a center of a separator main body having an inlet pipe in a tangential direction connected thereto, and a multiplicity of auxiliary outflow holes are provided on an outer circumferential surface thereof. In such an oil separator, the auxiliary outflow holes are each provided with a hood having an opening formed on a frontward side in a swirling direction of the vortex. Further, Patent Document 2 discloses an oil separator in which an inlet pipe is connected to a shell having a gas outflow pipe inserted and installed in its center so that a tangential line of an outer circumferential side of a curved pipe portion of the inlet pipe matches a tangential line of an inner wall of the shell.

Further, examples of disclosed oil separators that have been reduced in size and built into a compressor include an oil separator in which a separation cylinder is integrally formed with a compressor housing, and a gas outlet holes is provided inclining toward a lower end side of the separation cylinder with respect to an axial line of the separation cylinder, as illustrated in Patent Document 3. Furthermore, examples of disclosed oil separators integrated with a compressor include an oil separator in which a separation cylinder is integrally provided with a compressor housing, a separation pipe is installed in a center thereof, an inner circumferential separation cylinder having a multiplicity of communication holes is installed in an inner circumferential bottom region of the separation cylinder, and an annular space is formed between the inner circumferential separation cylinder and the separation cylinder, thereby ensuring that the separated oil is introduced downward, as illustrated in Patent Document 4.

CITATION LIST

Patent Literature(s)

Patent Document 1: Japanese Patent No. 2830618B
Patent Document 2: Japanese Unexamined Patent Application Publication No. 2010-286193A
Patent Document 3: Japanese Unexamined Patent Application Publication No. 2004-324564A
Patent Document 4: Japanese Unexamined Patent Application Publication No. 2013-15069A

SUMMARY OF THE INVENTION

Technical Problem

In the cyclone-type oil separator, while there is no denying that the way in which the oil is efficiently separated using centrifugal force is important, inhibiting a phenomenon in which the oil once separated is swirled up by the gas flow, re-entrained, and discharged along with the gas flow is critical to improving oil-separation efficiency. While Patent Document 1 discloses the oil separator in which auxiliary outflow holes with a hood are provided, thereby decreasing the amount of oil discharged from the outflow holes, the oil separator cannot reduce the re-entrainment of the oil once separated, resulting in a limit to the advantages thereof and failure to sufficiently increase oil-separation efficiency.

On the other hand, while Patent Document 4 discloses the oil separator in which an inner circumferential separation cylinder having a multiplicity of communication holes is installed in an inner circumferential bottom region of a separation cylinder and an annular space is formed between the inner circumferential separation cylinder and the separation cylinder, thereby ensuring that the separated oil is introduced downward, the oil separator cannot actively capture the oil with the communication holes. Moreover, because the annular space is in communication with the internal space of the separation cylinder via the multiplicity of communication holes, the oil separator cannot always disrupt contact between the gas flow and separated oil. Such an oil separator thus fails to sufficiently improve oil-separation efficiency, resulting in a desire for further improvement. In particular, with a configuration in which the oil separator is built into the compressor, the separation cylinder is reduced in size, and thus the way in which the re-entrainment of the oil once separated is reduced is critical to improving oil-separation efficiency.

The present invention has been made in view of such circumstances, and an object of the present invention is to provide an oil separator with which oil-separation efficiency can be improved by reliably capturing oil once separated, and inhibiting the re-entrainment of the oil; and a compressor provided with the oil separator.

Solution to Problem

According to a first aspect of the present invention, an oil separator is provided with a cylindrical separation cylinder, and is configured such that oil included in a gas flowing in from a gas inflow port provided in a tangential direction is centrifugally separated along an inner circumferential surface of the separation cylinder, and the separated oil is discharged from one end side of the separation cylinder while the gas is discharged from another end side of the separation cylinder. An opening that communicates with the gas inflow port and a plurality of oil-capturing openings that protrude toward and are open at an inner circumferential side of the separation cylinder are provided to the inner circumferential surface, a cylindrical body is fitted to the inner circumferential surface, and a plurality of oil passages that communicate with the oil-capturing openings are provided to an outer circumferential surface side of the cylindrical body.

According to this configuration, gas that includes oil flows from the gas inflow port into the cylindrical body fitted to the inner circumferential surface of the separation cylinder from the tangential direction to develop a vortex, thereby making it possible to centrifugally separate the oil in the gas along the inner circumferential surface thereof. With such a configuration, the oil is captured by the plurality of oil-capturing openings that protrude toward and are open at the inner circumferential side of the cylindrical body, and introduced to the oil passages provided to the outer circumferential surface side of the cylindrical body, thereby making it possible to discharge the oil separated from the gas flow from one end side of the cylindrical body while discharging the gas from which the oil has been separated from another end side of the cylindrical body. As a result, it is possible to inhibit a phenomenon in which the oil once separated is swirled up by the gas flow, re-entrained, and discharged along with the gas flow, and thus improve oil-separation efficiency.

In the first aspect, the above-described oil-capturing openings may open so as to directly face the gas flow that is a vortex inside the above-described cylindrical body.

According to this configuration, it is possible to efficiently gather the oil centrifugally separated along the inner circumferential surface of the cylindrical body by the vortex via the oil-capturing openings directly facing the gas flow, introduce the oil to the oil passages provided to the outer circumferential surface side of the cylindrical body, and discharge the oil from one end side of the cylindrical body. As a result, the oil-gathering efficiency of the oil-capturing openings can be increased, making it possible to further improve oil-separation efficiency.

In the first aspect, the above-described plurality of oil passages may be spirally provided to the outer circumferential surface of the above-described cylindrical body and extend to one end side of the cylindrical body.

According to this configuration, the oil captured by the oil-capturing openings and introduced to the oil passages never comes in contact with the gas flow along the spiral oil passages, making it possible to swiftly introduce the oil to one end side of the cylindrical body and discharge the oil from the separation cylinder to an oil reservoir or the like outside. As a result, the separated oil is efficiently gathered, making it possible to smoothly return the oil to a necessary oil supply location for recirculation without re-entrainment.

In the first aspect, the above-described plurality of oil passages may be formed as grooves on the outer circumferential surface of the above-described cylindrical body, with the opening sides of the grooves blocked by the inner circumferential surface of the above-described separation cylinder.

According to this configuration, the grooves are formed by a suitable machining method (such as press forming, rolling, or cutting) in the outer circumferential surface of the cylindrical body and the opening sides are blocked by fitting the cylindrical body to the inner circumferential surface of the separation cylinder, thereby making it possible to form oil passages separated from a gas flow path. As a result, it is possible to reliably inhibit a mode in which the oil once separated comes in contact with the gas flow while flowing down the oil passages, is re-entrained, and discharged along with the gas flow, and thus improve oil-separation efficiency.

In the first aspect, the cylindrical body may be formed by bending a pipe material or a sheet material.

According to this configuration, the cylindrical body provided with the opening which communicates with the gas inflow port, the oil-capturing openings which protrude toward and are open at the inner circumferential side, and the plurality of oil passages which communicate with the oil-capturing openings can be simply manufactured by a general machining method using the pipe material or the sheet material subjected to bending. As a result, it is possible to simply configure the oil separator having high oil-separation efficiency in which the cylindrical body is fitted to the inner circumferential surface of the separation cylinder, at low cost.

In the first aspect, the above-described separation cylinder may be a vessel having an independent enclosed structure, an inflow pipe of the gas that includes oil may be connected to the above-described gas inflow port, and the outflow pipe of the separated oil may be connected to one end side and the outflow pipe of the separated gas may be connected to another end side of the vessel.

According to this configuration, it is possible to incorporate a cyclone-type oil separator into a discharge circuit of a refrigeration cycle by connecting a discharge pipe of the compressor to the gas inflow pipe of this oil separator, connecting an oil return pipe of the compressor to the oil outflow pipe, and connecting a high-pressure gas pipe extending to a heat exchanger to the gas outflow pipe, and thus reduce the size of the oil separator installed in the refrigeration cycle and increase efficiency.

Further, according to a second aspect of the present invention, a compressor is provided with a housing, and the housing has built therein an oil separator that separates oil. In this compressor, a cylindrical separation cylinder is integrally provided to the housing, and any one of the aforementioned oil separators is incorporated as the above-described separation cylinder.

According to this configuration, the cylindrical separation cylinder is integrally provided to the housing of the compressor and the cylindrical body is fitted to the inner circumferential surface of the separation cylinder, thereby making it possible to integrally build the aforementioned cyclone-type oil separator into the compressor. As a result, it is possible to increase the oil-separation efficiency of a compact, built-in oil separator, reduce an oil rise from the compressor and thus an oil circulation rate (OCR), improve a heat exchange performance of each of the heat exchangers of an air conditioner, a refrigerator, various heat pumps, and the like, and enhance the capacity thereof.

Advantageous Effects of Invention

According to the oil separator of the present invention, gas that includes oil flows from the inflow port into the cylindrical body fitted to the inner circumferential surface of the separation cylinder from the tangential direction to develop a vortex, thereby making it possible to centrifugally separate the oil in the gas along the inner circumferential surface thereof. Further, the oil is captured by the plurality of oil-capturing openings that protrude toward and are open at the inner circumferential side of the cylindrical body and introduced to the oil passages provided to the outer circumferential surface side of the cylindrical body, thereby making it possible to discharge the oil separated from the gas flow from one end side of the cylindrical body and discharge the gas from which the oil has been separated from another end side of the cylindrical body. As a result, it is possible to prevent the phenomenon in which the oil once separated is swirled up by the gas flow, re-entrained, and discharged along with the gas flow, and thus improve oil-separation efficiency.

According to the compressor of the present invention, the cylindrical separation cylinder is integrally provided to the compressor housing and the cylindrical body is fitted to the inner circumferential surface of the separation cylinder, thereby making it possible to integrally build the aforementioned cyclone-type oil separator into the compressor. As a result, it is possible to increase the oil-separation efficiency of the compact, built-in oil separator, reduce the oil rise from the compressor and thus the oil circulation rate (OCR), improve the heat exchange performance of each of the heat exchangers of an air conditioner, a refrigerator, various heat pumps, and enhance the capacity thereof.

BRIEF DESCRIPTION OF DRAWING(S)

FIG. 3A is a side view, FIG. 3B is a right side view, FIG. 3C is a rear view.

DESCRIPTION OF EMBODIMENTS

Embodiments of the present invention will be described below, referring to the attached drawings.

First Embodiment

A first embodiment of the present invention will be described below, using FIG. 1 to FIG. 7.

Figure 1:
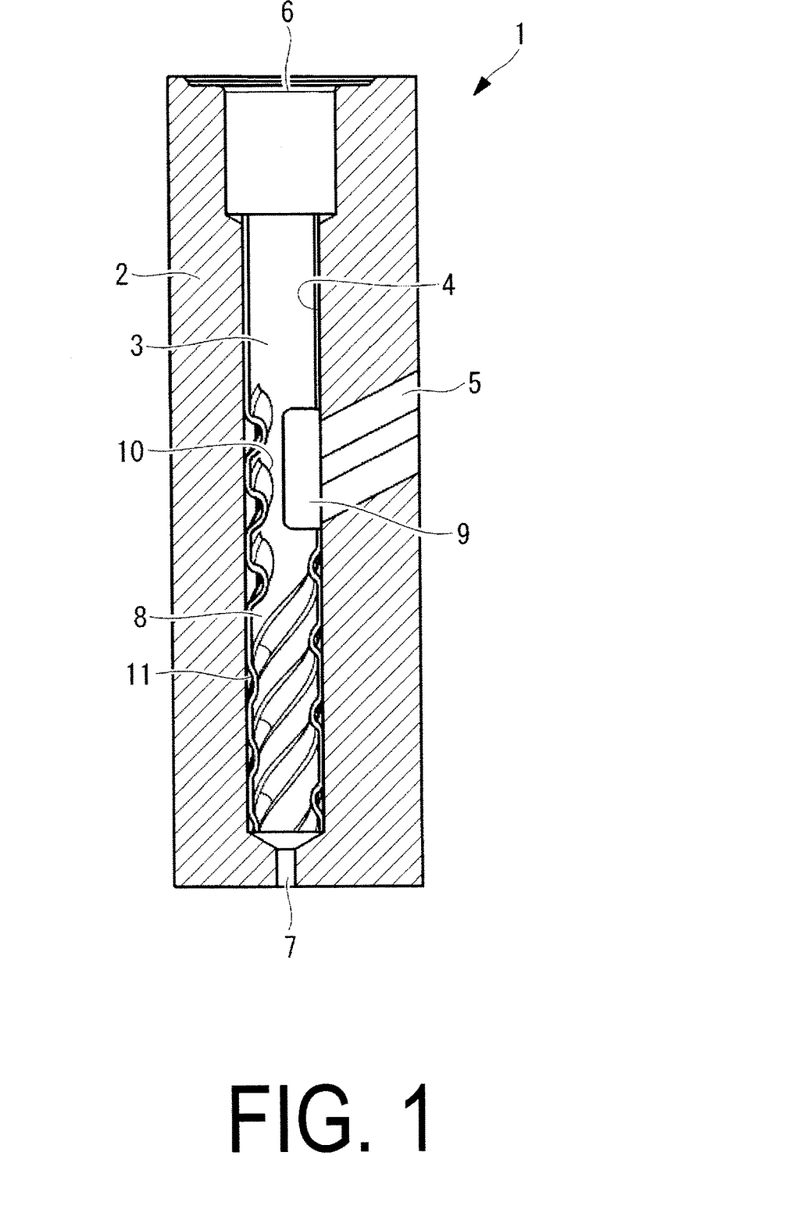
FIG. 1 is a longitudinal sectional view of an oil separator according to a first embodiment of the present invention.
Figure 2:
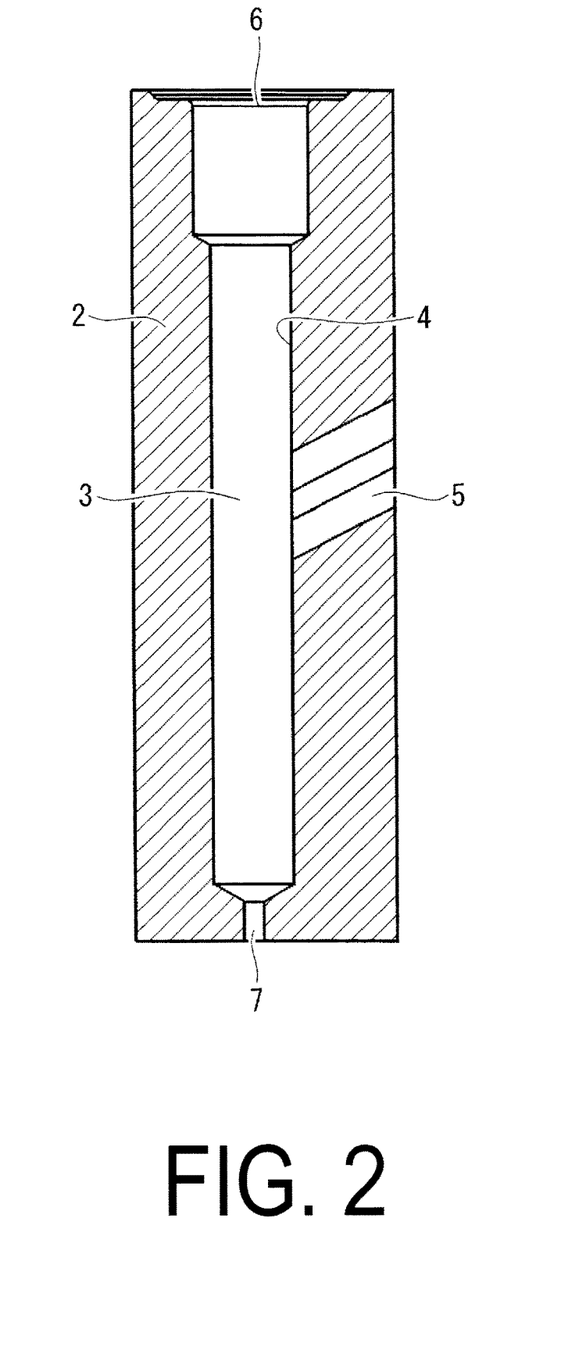
FIG. 2 is a longitudinal sectional view of a separation cylinder of the above-described oil separator.
Figure 3A:
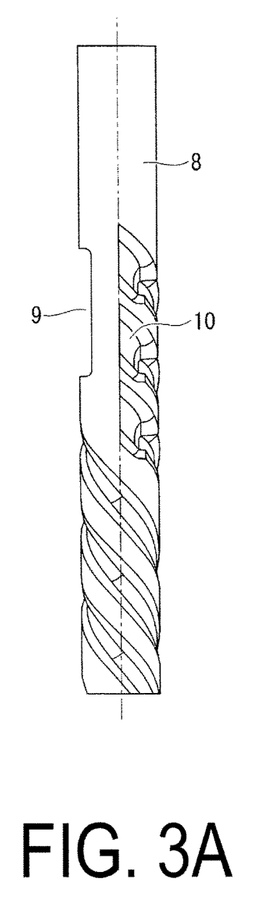
Figure 3B:
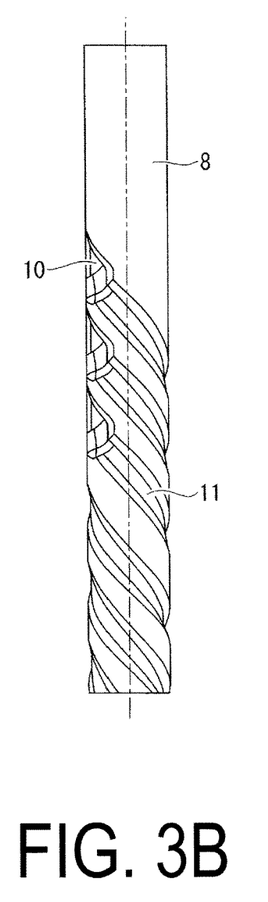
Figure 3C:
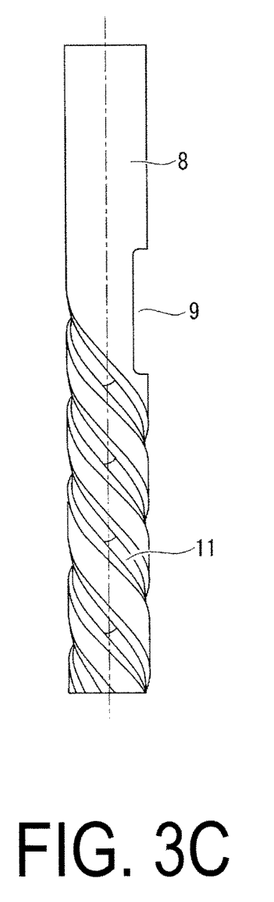
Figure 3D:
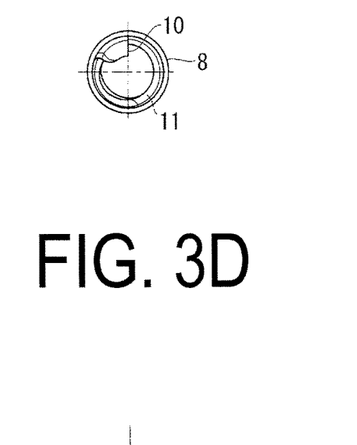
FIG. 3D is a top view of a cylindrical body of the above-described oil separator.
Figure 4:
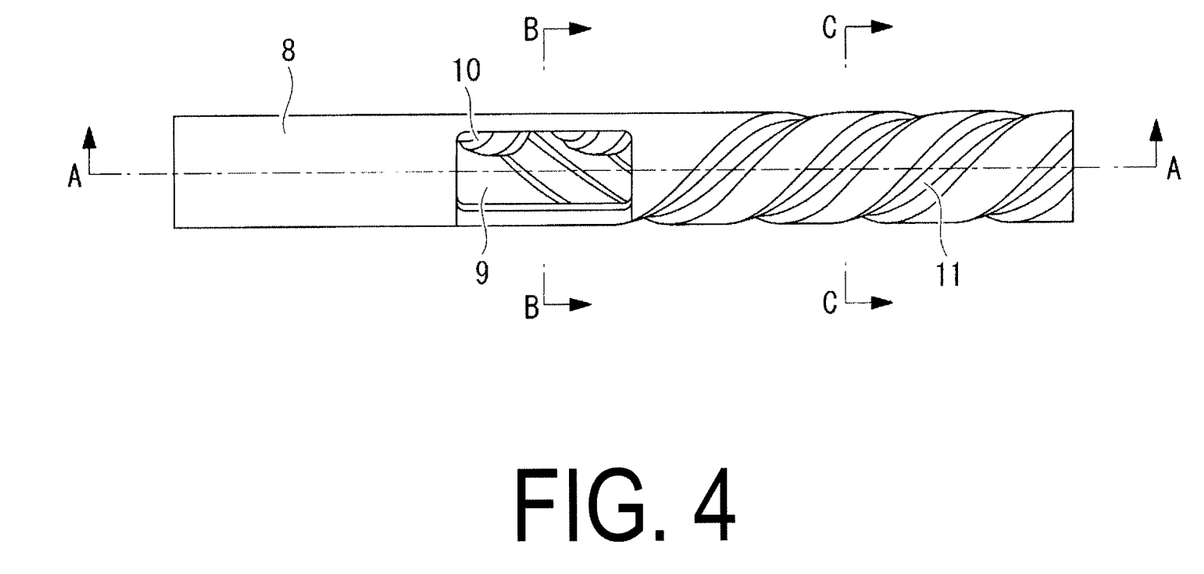
FIG. 4 is a plan view of a side of the cylindrical body of the above-described oil separator provided with a gas inflow opening.
Figure 5:
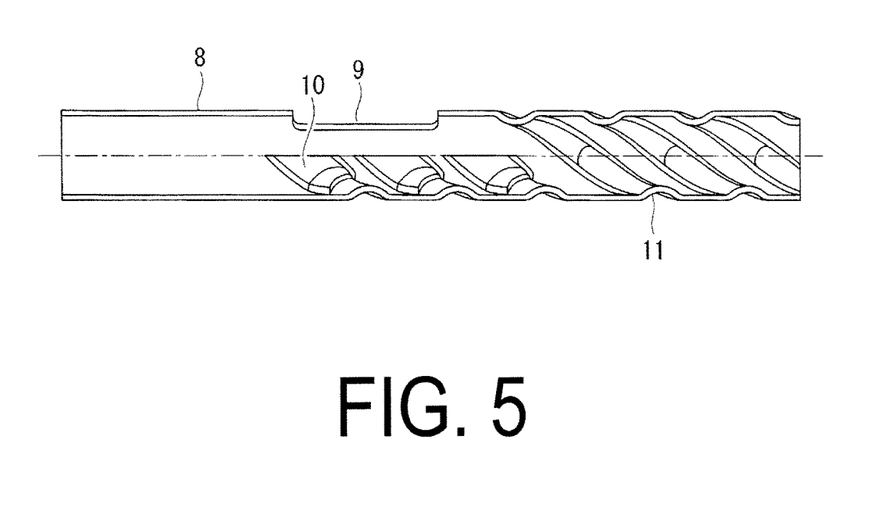
FIG. 5 is a cross-sectional view along A-A in FIG. 4.
Figure 6:
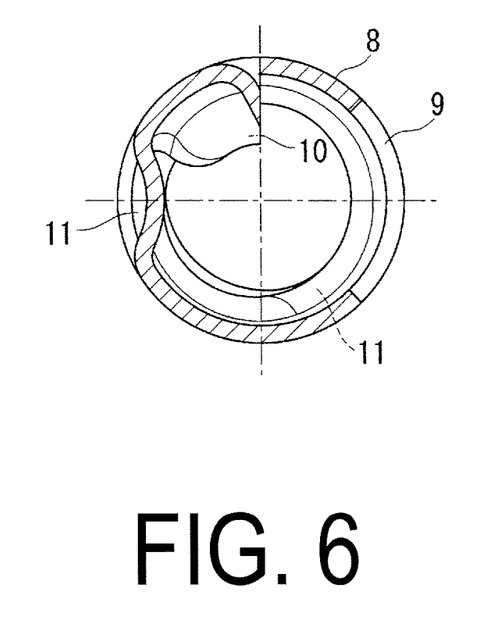
FIG. 6 is a cross-sectional view along B-B in FIG. 4.
Figure 7:
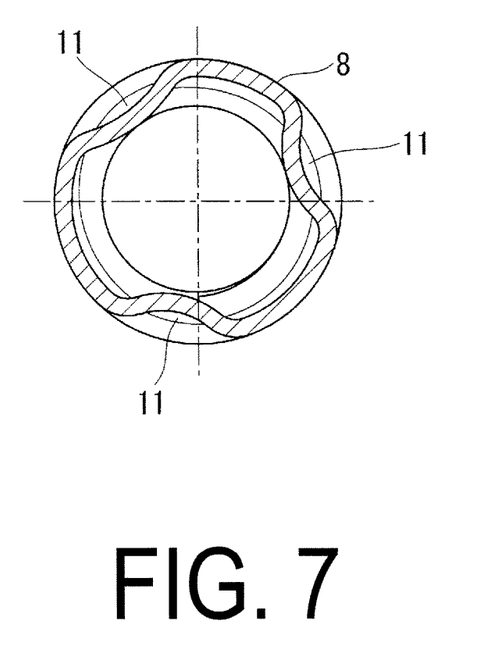
FIG. 7 is a cross-sectional view along C-C in FIG. 4.

FIG. 1 illustrates a longitudinal sectional view of an oil separator according to the first embodiment of the present invention, FIG. 2 illustrates a longitudinal sectional view of a separation cylinder thereof, and FIGS. 3 to 7 illustrate detailed structural views of the cylindrical body of the oil separator.

An oil separator 1 includes a cylindrical separation cylinder 2, and a cylindrical body 8 fitted to an inner circumferential surface 4 of a cylindrical gas flow path 3 inside the separation cylinder 2.

The separation cylinder 2 has the cylindrical gas flow path 3 formed therein, and a gas inflow port 5 (two gas inflow ports, an upper and a lower, in this example) extending in a tangential direction opens obliquely downward to the cylindrical gas flow path 3. The gas inflow ports 5 are in communication with a discharge chamber and the like of a compressor. Further, a fitting portion 6 for connecting a pipe for discharging the gas from which the oil has been separated is provided to an upper end portion of the gas flow path 3, and an outflow hole 7 for the oil separated from the gas is provided to a lower end portion of the gas flow path 3. It should be noted that the oil outflow hole 7 is in communication with an oil reservoir or the like.

The separation cylinder 2 discharges the refrigerant gas, which includes oil, from the gas inflow ports 5 to the cylindrical gas flow path 3 in the interior, developing a vortex in the gas, thereby constituting a cyclone-type oil separator 1 that centrifugally separates the oil. In the oil separator 1 of the present embodiment, the cylindrical body 8 is fit in a tightly adhered state to the inner circumferential surface 4 of the cylindrical gas flow path 3 to improve oil-separation efficiency.

This cylindrical body 8 is a thin pipe-shaped cylindrical body extending from a lower portion of the fitting portion 6 of the gas flow path 3 to the lower end portion of the gas flow path 3 provided with the oil outflow hole 7, and the specific configuration thereof is illustrated in FIGS. 3A to 7.

A rectangular gas inflow opening 9 elongated in a longitudinal direction so as to face the gas inflow ports 5 on the separation cylinder 2 side is provided in a substantially intermediate position in a length direction of the cylindrical body 8, and a plurality of oil-capturing openings 10 are provided in a vertical direction to a region on a downstream side in the gas flow direction of this opening 9. The opening 9 and the oil-capturing openings 10 are each provided so as to pass through an inside and an outside of the cylindrical body 8.

The opening 8 introduces the gas discharged from the gas inflow ports 5 as is, developing a vortex in the tangential direction along an inner circumferential surface of the cylindrical body 8. Meanwhile, the plurality of oil-capturing openings 10 protrude by a predetermined dimension toward and are open at the inner circumferential side of the cylindrical body 8, and open so as to directly face the gas flow that is a vortex.

This plurality of oil-capturing openings 10 are in communication with oil passages 11 constituted by a plurality of rows of grooves spirally provided to an outer circumferential surface side of the cylindrical body 8. Each of the oil passages 11 extends from an opening position of the oil-capturing opening 10 to a lower end portion of the cylindrical body 8, causing the oil captured by the oil-capturing opening 10 and introduced to the oil passage 11 side to flow down to the lower end portion of the cylindrical body 8 and be discharged to the oil outflow hole 7. It should be noted that, with the cylindrical body 8 fitted in a tightly adhered state to the inner circumferential surface 4 of the gas flow path 3 and the opening sides of the grooves blocked by the inner circumferential surface 4, the oil passages 11 are passages separated and independent from the gas flow path 3.

The cylindrical body 8 may be formed by, for example, forming grooves in an outer circumferential surface of a seamless pipe by rolling or the like, opening the oil-capturing openings 10 so that the oil-capturing openings 10 directly face the gas flow on an end protruding to the inner circumferential side thereof, and providing the opening 9 facing the gas inflow ports 5. Further, the cylindrical body 8 may be formed by using a sheet material in place of the pipe material, punching out the opening 9 in each predetermined position, press-forming the grooves, opening the oil-capturing openings 10 so that the oil-capturing openings 10 directly face the gas flow at an end portion thereof, and bending the material into a pipe shape. It should be noted that the grooves may be formed by cutting or the like as well.

Furthermore, to ensure that an opening surface area of the oil-capturing opening 10 is slightly greater than a cross-sectional area of the oil passage 11, the cross-sectional area of an end portion on the side provided with the oil-capturing opening 10 of the oil passage 11 may be configured greater by such an amount, and the oil-capturing opening 10 may be provided to that end portion so as to directly face the gas flow. Further, while the oil-capturing openings 10 protrude and are open so as to project from the inner circumferential surface of the cylindrical body 8 to the center side, the opening shape may be a variety of shapes, such as a scale-like shape, semicircle, or a polygon so as to facilitate oil capture.

According to the configuration as described above, the present embodiment has the following action and effects.

High-pressure gas that is compressed by the compressor and includes the oil discharged from the gas inflow ports 5 via the discharge chamber or the like into the cylindrical body 8 fitted to the inner circumferential surface thereof, inside the gas flow path 3 of the separation cylinder 2 of the oil separator 1. At this time, the gas inflow ports 5 are open in the tangential direction with respect to the cylindrical gas flow path 3, thereby developing a vortex in the gas flow. As a result, the oil included in the gas is separated along an inner circumferential wall of the cylindrical body 8 by the centrifugal force.

This oil is captured by the plurality of oil-capturing openings 10 that protrude from the inner circumferential surface of the cylindrical body 8 to a center side and open so as to directly face the vortex, and introduced to the oil passages 11 provided to an outer circumference of the cylindrical body 8 to which the oil-capturing openings 10 extend. Thus, the centrifugally separated oil is gathered by the plurality of oil-capturing openings 10 that open on the inner wall of the cylindrical body 8, without flowing downward along the inner wall of the cylindrical body 8, and introduced to the oil passages 11 provided on the outer circumference of the cylindrical body 8, thereby causing the oil separated from the gas flow to flow downward inside the spiral oil passages 11 and be discharged from the lower end portion of the cylindrical housing 8 to the oil outflow hole 7.

As a result, it is possible to reliably inhibit the phenomenon in which the oil once separated is swirled up by the gas flow, re-entrained, and discharged from the oil separator 1 along with the gas flow to the outside, and thus increase oil-separation efficiency. Meanwhile, the gas from which the oil has been separated rises inside the cylindrical body 8 and is fed outside via the gas outflow pipe connected to the fitting portion 6 provided on the upper end portion of the gas flow path 3, making it possible to suppress the oil rise to the refrigerant circuit side.

Thus, according to the present embodiment, the cyclone-type oil separator 1 has, provided to the inner circumferential surface 4 of the separation cylinder 3 therein, the opening 9 which communicates with the gas inflow ports 5, and the plurality of oil-capturing openings 10 which protrude toward and are open at the inner circumferential side. Furthermore, in the cyclone-type oil separator 1, the cylindrical body 8 is fitted which has, provided to the outer circumferential side, the plurality of oil passages 11 which communicate with the oil-capturing openings 10. As a result, the gas that includes the oil flows from the gas inflow ports 5 into the cylindrical body 8 fitted to the inner circumferential surface 4 of the separation cylinder 2 from the tangential direction to develop a vortex, making it possible to centrifugally separate the oil in the gas along the inner circumferential surface thereof.

Then, the separated oil is captured by the plurality of oil-capturing openings 10 that protrude toward and are open at the inner circumferential side of the cylindrical body 8, and introduced to the oil passages 11 provided on the outer circumferential surface side of the cylindrical body 8, thereby making it possible to discharge the oil separated from the gas flow from one end side of the cylindrical body 8 while discharging the gas from which the oil has been separated from another end side of the cylindrical body 8. As a result, it is possible to inhibit a phenomenon in which the oil once separated is swirled up by the gas flow, re-entrained, and discharged along with the gas flow, and thus improve oil-separation efficiency.

Further, the above-described oil-capturing openings 10 are opened so as to directly face the gas flow that is a vortex inside the cylindrical body 8, making it possible to efficiently gather the oil centrifugally separated along the inner circumferential surface of the cylindrical body 8 by the vortex via the oil-capturing openings 10 directly facing the gas flow, introduce the oil to the oil passages 11 provided to the outer circumferential surface side of the cylindrical body 8, and discharge the oil from one end side of the cylindrical body 8. As a result, the oil-gathering efficiency of the oil-capturing openings 10 can be increased and the oil-separation efficiency can be further improved.

Furthermore, the plurality of oil passages 11 are spirally provided to the outer circumferential surface of the cylindrical body 8, and extend to one end side of the cylindrical body 8. As a result, the oil captured by the oil-capturing openings 10 and introduced to the oil passages 11 never comes in contact with the gas flow along the spiral oil passages 11, making it possible to swiftly introduce the oil to one end side of the cylindrical body 8 and discharge the oil from the separation cylinder 2 to an oil reservoir or the like outside. As a result, the separated oil is efficiently gathered, making it possible to smoothly return the oil to a necessary oil supply location for recirculation without re-entrainment.

Further, the plurality of oil passages 11 are formed as grooves in the outer circumferential surface of the cylindrical body 8, with the opening sides of the grooves blocked by the inner circumferential surface 4 of the separation cylinder 2, making it possible to form the grooves by a suitable machining method (such as press-forming, rolling, or cutting) in the outer circumferential surface of the cylindrical body 8, and block the opening sides by fitting the cylindrical body 8 to the inner circumferential surface 4 of the separation cylinder 2, and thus form the oil passages 11 separated from the gas flow path 3. Accordingly, it is possible to reliably inhibit a mode in which the oil once separated comes in contact with the gas flow while flowing down the oil passages 11, is re-entrained, and discharged along with the gas flow, and thus improve oil-separation efficiency.

Furthermore, the cylindrical body 8 is formed by bending the pipe material or the sheet material. As a result, the cylindrical body 8 provided with the opening 9 which communicates with the gas inflow ports 5, the oil-capturing openings 10 which protrude toward and are open at the inner circumferential side, and the plurality of oil passages 11 which communicate with the oil-capturing openings 10 can be simply manufactured by a general machining method using the pipe material or the sheet material subjected to bending. As a result, it is possible to simply configure the oil separator 1 having high oil-separation efficiency in which the cylindrical body 8 is fitted to the inner circumferential surface of the separation cylinder 2, at low cost.

Other Embodiments

Next, other embodiments of the present invention will be described.

Figure 8:
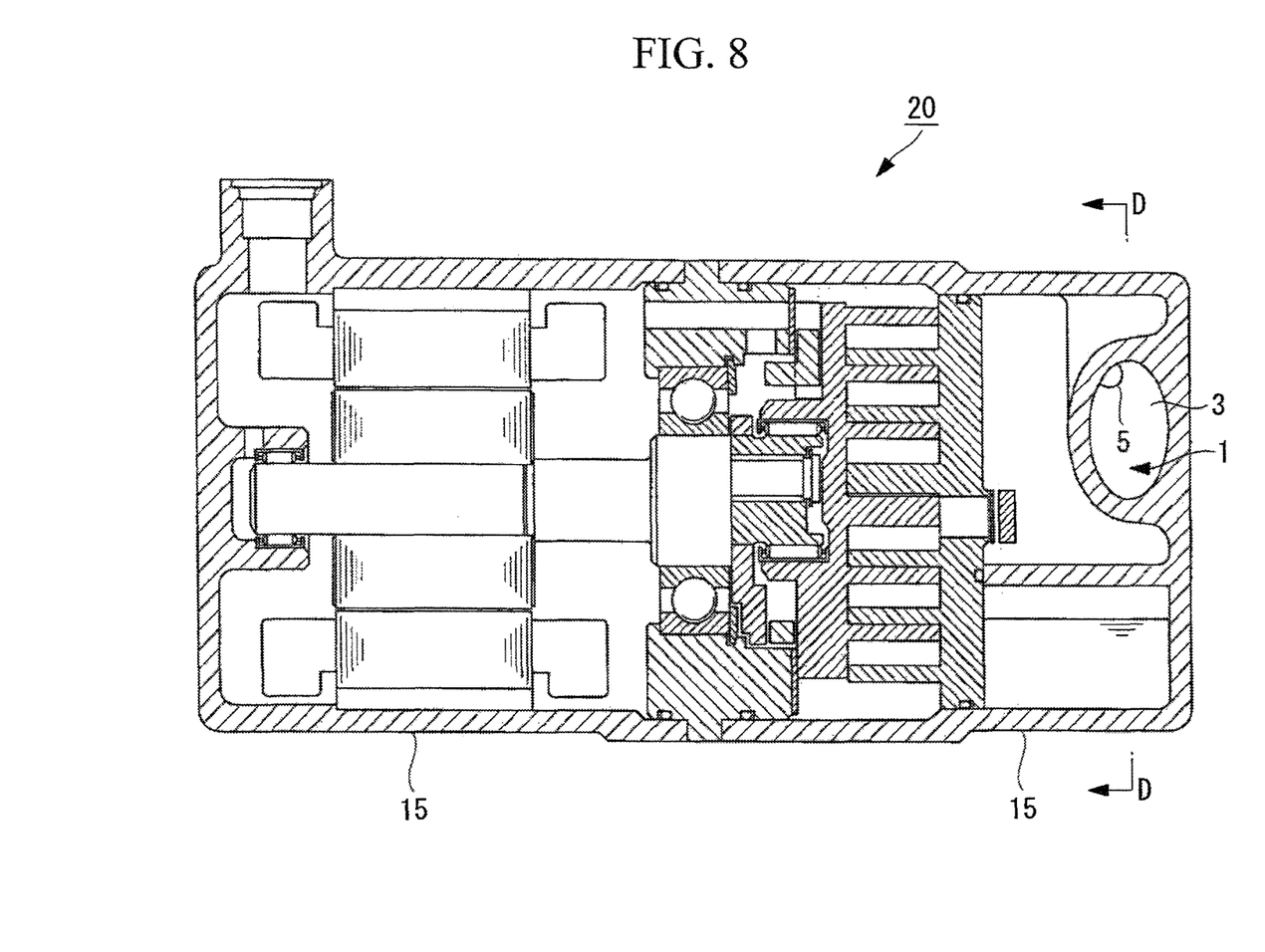
FIG. 8 is a longitudinal view of a compressor.
Figure 9:
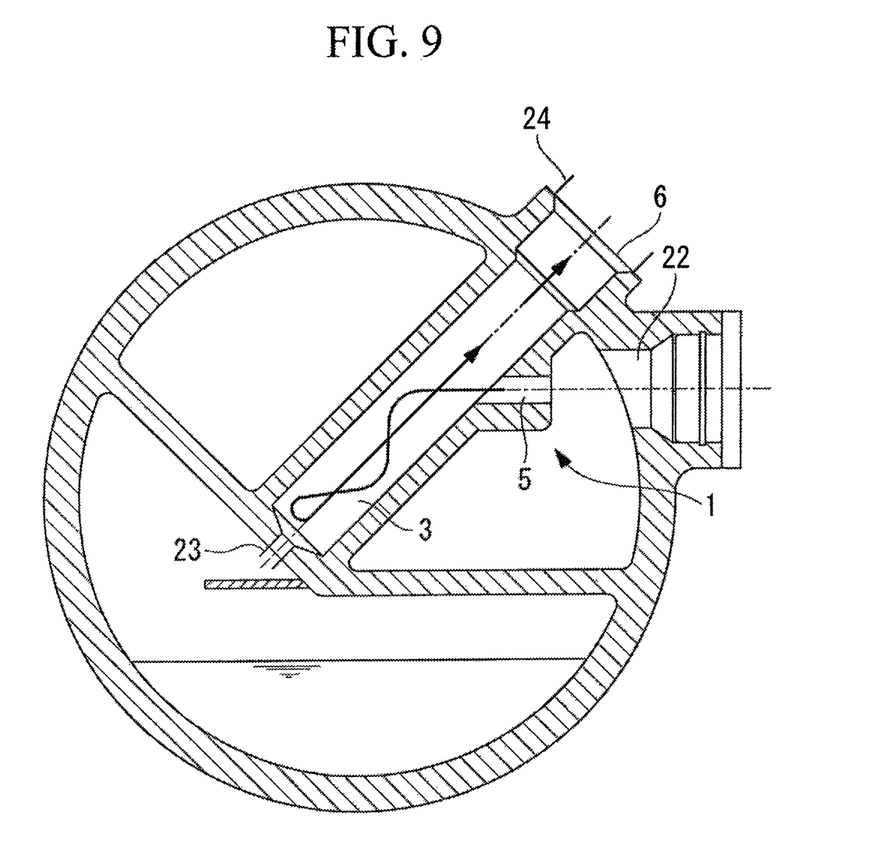
FIG. 9 is a cross-sectional view along D-D in FIG. 8.

(1) While the basic configuration of the cyclone-type oil separator 1 according to the present invention is illustrated in the above-described first embodiment, when this oil separator 1 is provided in a discharge circuit of a compressor in a refrigeration cycle of an air conditioner, refrigerator, various heat pumps, or the like, the oil separator 1 may be configured so that the above-described separation cylinder 2 is a vessel having an independent enclosed structure, an inflow pipe of the gas that includes the oil is connected to the gas inflow ports 5, and an outflow pipe of the separated oil is connected to one end side and the outflow pipe of the separated gas is connected to another end side of the vessel. FIG. 8 illustrates a compressor 20 while FIG. 9, is a cross section along lined D-D of FIG. 8. FIG. 8 illustrate housing 15 and FIG. 9 illustrates inflow pipe 22 of gas including oil, outflow pipe 23 of separated oil, and an outflow pipe 24 of separated gas.

Thus, with the separation cylinder 2 being an independent enclosed-structural vessel, the inflow pipe of the gas that includes the oil connected to the gas inflow ports 5, and the outflow pipe of the separated oil connected to one end side and the outflow pipe of the separated gas connected to another end side of the enclosed vessel, it is possible to incorporate the oil separator 1 in the discharge circuit of the refrigeration cycle by connecting the gas inflow pipe of the oil separator 1 to a discharge pipe of the compressor, connecting the oil outflow pipe to an oil return pipe of the compressor, and connecting the gas outflow pipe to a high-pressure gas pipe extending to a heat exchanger, and thus reduce the size of the oil separator 1 installed in the refrigeration cycle and increase efficiency.

(2) When the above-described oil separator 1 is built into a compressor, the oil separator 1 may be integrally incorporated into the housing of the compressor by integrally forming the cylindrical separation cylinder 2 with the housing of the compressor, fitting the above-described cylindrical body 8 inside the separation cylinder 2, communicating the gas inflow ports 5 with the discharge chamber of the compressor, communicating the oil outflow hole 7 with the oil reservoir of the compressor, and connecting the discharge pipe to the fitting portion 6 of the upper end portion of the separation cylinder 2.

Thus, with the cylindrical separation cylinder integrally formed with the housing of the compressor and the aforementioned oil separator 1 incorporated with this cylindrical separation cylinder as the separation cylinder 2, it is possible to integrally build the cyclone-type oil separator 1 into the compressor. As a result, it is possible to increase the oil-separation efficiency of a compact, built-in oil separator 1, reduce an oil rise from the compressor to lower an oil circulation rate (OCR), improve a heat exchange performance of each of the heat exchangers of an air conditioner, a refrigerator, various heat pumps, and the like, and enhance the capacity thereof.

Note that the present invention is not limited to the invention according to the embodiments as described above, and changes can be made as appropriate without departing from the gist thereof. For example, in the above-described embodiments, while the opening shape of the oil-capturing openings 10 is a scale-like shape, semicircle, or polygon, the cross-sectional shape of the oil passages 11 communicated with the oil-capturing openings 10 is not particularly limited, allowing the cross-sectional shape of the grooves that constitute the passages 11 to have any shape, such as the same shape as the opening shape of the oil-capturing openings 10.

REFERENCE SIGNS LIST

1 Oil separator
2 Separation cylinder
3 Gas flow path
4 Inner circumferential surface
5 Gas inflow port
6 Fitting portion
7 Oil outflow hole
8 Cylindrical body
9 Opening
10 Oil-capturing opening
11 Oil passage

The invention claimed is:

1. An oil separator comprising a cylindrical separation cylinder, the oil separator being configured such that oil included in a gas flowing in from a gas inflow port provided in a tangential direction is centrifugally separated along an inner circumferential surface of the separation cylinder, and the separated oil is discharged from one end side of the separation cylinder while the gas is discharged from another end side of the separation cylinder, wherein
   a cylindrical body is provided with a first opening that communicates with the gas inflow port and a plurality of second openings that protrude toward and are open at an inner circumferential side, the cylindrical body is fitted to the inner circumferential surface of the separation cylinder, and a plurality of oil passages that communicate with the plurality of respective second openings are provided to an outer circumferential surface side of the cylindrical body,
   the plurality of oil passages are formed as grooves on an outer circumferential surface of the cylindrical body, and
   the plurality of oil passages are respectively provided, on one ends thereof, with the plurality of second openings, so that the plurality of oil passages are respectively in communication with the plurality of second openings,
   wherein the cylindrical separation cylinder is integrally provided to a housing, and the oil separator is incorporated with the cylindrical separation cylinder serving as the separation cylinder,
   wherein the plurality of oil passages are spirally provided to the outer circumferential surface of the cylindrical body and extend to one end side of the cylindrical body, and
   wherein the plurality of oil passages are formed as grooves on the outer circumferential surface side of the cylindrical body, and opening sides of the grooves are blocked by the inner circumferential surface of the separation cylinder.

2. The oil separator according to claim 1, wherein the separation cylinder is a vessel having an independent enclosed structure, an inflow pipe of gas including oil is connected to the gas inflow port, and an outflow pipe of separated oil is connected to one end side of the vessel and an outflow pipe of separated gas is connected to another end side of the vessel.

3. A compressor comprising a housing, the housing having an oil separator built therein, and the oil separator being configured to separate oil, wherein
   a cylindrical separation cylinder is integrally provided to the housing, and the oil separator described in claim 1 is incorporated with the cylindrical separation cylinder serving as the separation cylinder.

4. The oil separator according to claim 1, wherein the cylindrical body is formed by bending a pipe material or a sheet material.

5. The oil separator according to claim 4, wherein the separation cylinder is a vessel having an independent enclosed structure, an inflow pipe of gas including oil is connected to the gas inflow port, and an outflow pipe of separated oil is connected to one end side of the vessel and an outflow pipe of separated gas is connected to another end side of the vessel.

6. The oil separator according to claim 1, wherein the oil-capturing openings are open so as to directly face a gas flow that is a vortex inside the cylindrical body.

7. The oil separator according to claim 6, wherein the cylindrical body is formed by bending a pipe material or a sheet material.

8. The oil separator according to claim 6, wherein the separation cylinder is a vessel having an independent enclosed structure, an inflow pipe of gas including oil is connected to the gas inflow port, and an outflow pipe of separated oil is connected to one end side of the vessel and an outflow pipe of separated gas is connected to another end side of the vessel.

9. A compressor comprising a housing, the housing having an oil separator built therein, and the oil separator being configured to separate oil, wherein
a cylindrical separation cylinder is integrally provided to the housing, and the oil separator described in claim 6 is incorporated with the cylindrical separation cylinder serving as the separation cylinder.

10. A compressor comprising a housing, the housing having an oil separator built therein, and the oil separator being configured to separate oil, the oil separator comprising a cylindrical separation cylinder, the oil separator being configured such that oil included in a gas flowing in from a gas inflow port provided in a tangential direction is centrifugally separated along an inner circumferential surface of the separation cylinder, and the separated oil is discharged from one end side of the separation cylinder while the gas is discharged from another end side of the separation cylinder, wherein
a cylindrical body is provided with a first opening that communicates with the gas inflow port and a plurality of second openings that protrude toward and are open at an inner circumferential side, the cylindrical body is fitted to the inner circumferential surface of the separation cylinder, and a plurality of oil passages that communicate with the plurality of respective second openings are provided to an outer circumferential surface side of the cylindrical body,
the plurality of oil passages are formed as grooves on an outer circumferential surface of the cylindrical body, and
the plurality of oil passages are respectively provided, on one ends thereof, with the plurality of second openings, so that the plurality of oil passages are respectively in communication with the plurality of second openings,
wherein the cylindrical separation cylinder is integrally provided to the housing, and the oil separator is incorporated with the cylindrical separation cylinder serving as the separation cylinder,
wherein the plurality of oil passages are spirally provided to the outer circumferential surface of the cylindrical body and extend to one end side of the cylindrical body, and
wherein the plurality of oil passages are formed as grooves on the outer circumferential surface side of the cylindrical body, and opening sides of the grooves are blocked by the inner circumferential surface of the separation cylinder.

* * * * *